(12) United States Patent
Hurwitz (10) Patent No.: US 11,013,963 B2
(45) Date of Patent: *May 25, 2021

(54) CIRCULATING RING SUPPORT FOR BOWLING BALL ENCLOSURE

(71) Applicant: Magnum Shielding Corporation, Pittsford, NY (US)

(72) Inventor: Scott L. Hurwitz, Rochester, NY (US)

(73) Assignee: Magnum Shielding Corporation, Pittsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,279

(22) Filed: Oct. 4, 2019

(65) Prior Publication Data

US 2020/0030666 A1 Jan. 30, 2020

Related U.S. Application Data

(63) Continuation of application No. 15/952,967, filed on Apr. 13, 2018, now Pat. No. 10,463,922.

(51) Int. Cl.
*A63B 47/00* (2006.01)
*B65D 81/38* (2006.01)
(Continued)

(52) U.S. Cl.
CPC ............ *A63B 47/007* (2013.01); *B32B 3/266* (2013.01); *B32B 27/32* (2013.01); *B32B 27/36* (2013.01);
(Continued)

(58) Field of Classification Search
CPC ........... A45C 3/00; A45C 13/02; B32B 3/266; B32B 27/32; B32B 27/36;
(Continued)

(56) References Cited

U.S. PATENT DOCUMENTS 1,717,587 A 6/1929 Shipley
1,802,682 A 4/1931 Stupecky
(Continued)

OTHER PUBLICATIONS

DuPont Packaging Polymers, DuPont Teijin Films MYLAR®, HS Polyester Film, 65 Gauge product data sheet, found on Worldwide Web at: www.matweb.com/search/datasheet.aspx?matguid=81861baecfad45c28d6d8d4aabfee545&n=1&ckck=1 printed May 18, 2020, 1 page.

*Primary Examiner* — Bryon P Gehman
(74) *Attorney, Agent, or Firm* — Brian B. Shaw, Esq.; Harter Secrest & Emery LLP (57) ABSTRACT

A method and a bowling ball enclosure are provided for encasing and reducing temperature fluctuations of and within a bowling ball. The bowling ball enclosure includes an inner layer and an outer layer that are made of a polymer material, the inner layer forming an interior region that receives the bowling ball, at least one of the inner layer and the outer layer being monolithic. The bowling ball enclosure also includes a bottom portion and a top portion, the top portion being reinforced with a stiffener to support the top portion, the stiffener being connected to at least one of the inner layer and the outer layer, the top portion being positionable from a first position to a second position to encapsulate the bowling ball. In the first position, the top portion being in an open position to receive the bowling ball into the interior region. In the second position, the top portion being in a closed position to encapsulate the bowling bowl, the top portion being folded towards the bottom portion to decrease the amount of empty space in the interior region. A bottom perforated circulating ring support is located between the bowling ball enclosure and a support surface, wherein the bottom perforated circulating ring support provides for a circulation of air between the support surface and the bottom of the bowling ball enclosure.

17 Claims, 5 Drawing Sheets

(51) Int. Cl.
  *B32B 27/36* (2006.01)
  *B32B 3/26* (2006.01)
  *B32B 27/32* (2006.01)
(52) U.S. Cl.
  CPC .. *B65D 81/3897* (2013.01); *A63B 2243/0054* (2013.01); *B32B 2307/304* (2013.01); *B32B 2323/04* (2013.01); *B32B 2367/00* (2013.01); *B32B 2439/46* (2013.01)
(58) Field of Classification Search
  CPC .......... B32B 2307/304; B32B 2323/04; B32B 2367/00; B32B 2439/46; B65D 81/38; B65D 81/3802; B65D 81/3897; A63B 47/00; A63B 47/007; A63B 2243/0054
  USPC .......................................... 206/315.9, 315.91
  See application file for complete search history.

(56) References Cited

U.S. PATENT DOCUMENTS

| | | | |
|---|---|---|---|
| 2,302,802 A | 11/1942 | Roberts | |
| 2,617,012 A | 11/1952 | Westley | |
| 2,860,681 A | 11/1958 | Le Goff | |
| 3,079,967 A * | 3/1963 | Noel | A63B 47/007 206/315.91 |
| 3,091,681 A | 5/1963 | Mayer | |
| 3,136,398 A | 6/1964 | Platt | |
| 3,202,340 A | 8/1965 | Johnston | |
| 3,225,806 A | 12/1965 | Pollak | |
| 3,624,346 A | 11/1971 | Guth | |
| 3,873,119 A | 3/1975 | Koch | |
| 4,166,530 A | 9/1979 | Robinson | |
| 4,883,170 A | 11/1989 | Wright | |
| 4,958,729 A | 9/1990 | Wright | |
| 5,615,769 A | 4/1997 | Stephenson | |
| 6,099,023 A | 8/2000 | Be | |
| 7,322,585 B2 | 2/2008 | Handelman et al. | |
| 7,900,757 B2 | 3/2011 | Sisitsky | |
| 8,882,643 B1 | 11/2014 | Calkins | |
| 10,029,842 B2 | 7/2018 | Seiders | |
| 2007/0039111 A1 | 2/2007 | Curtis | |
| 2008/0093238 A1 | 4/2008 | Handelman et al. | |
| 2013/0069324 A1 | 3/2013 | Weibel et al. | |
| 2017/0129685 A1 | 5/2017 | Collins | |
| 2019/0071238 A1 | 3/2019 | Seiders et al. | |

* cited by examiner

CIRCULATING RING SUPPORT FOR BOWLING BALL ENCLOSURE

CROSS-REFERENCE TO RELATED APPLICATIONS

This application is a continuation-in-part of U.S. Nonprovisional patent application Ser. No. 15/952,967, filed Apr. 13, 2018, the content of which is relied upon and hereby incorporated herein by reference in its entirety.

BACKGROUND OF THE INVENTION

Field of the Invention

The present disclosure relates to an apparatus and method for encapsulating and reducing temperature fluctuations of a bowling ball and temperature differentials within a bowling ball so as to reduce induced core and layer separation, coverstock cracking, and accelerated resin coverstock aging through the evaporative drying of the bowling ball.

Description of Related Art

A bowling ball is typically made up of multiple layers, such as a core, a filler, and a coverstock, wherein each layer of material has a different thickness and composition. Heavier bowling balls may include additional layers of greater density material or more layers of a particular material. As each layer of material has a particular coefficient of thermal expansion, each layer will expand and contract at different corresponding rates, which upon exposure to a substantial change in ambient temperature may play a role in the occasional cracking of the bowling ball. For example, depending upon the season (summer or winter), a bowling ball may experience a temperature change of 20° F.-50° F. or greater, such as when transitioning between outdoors and "room temperature". Due to thermal expansion or contraction, the materials of an unprotected bowling ball may not be able to tolerate the sudden disparate changes in temperature, such as between the poles of the bowling ball or between the core and the outside of the bowling ball, thus resulting in cracking of the bowling ball.

If a bowling ball is placed on a concrete floor such as in a basement or garage, there is an ambient temperature difference directly contiguous to both the bottom and top polar regions of the bowling ball relative to its orientation resting on the floor. At times, there may be an ambient temperature differential of 6° F. or greater at the top and bottom polar regions of the bowling ball. After a period of time, this temperature gradient is directly transferred to the polar regions of the bowling ball, wherein the resulting temperature differential may cause the bowling ball to crack. It is believed the temperature differential affects each layer of material in the bowling ball creating tension from the coefficient of thermal expansion variability between the poles. It is also believed the outer coverstock itself may be susceptible to cracking from such temperature differentials.

Also, as the coverstocks may now be formed of a wide range of urethane and reactive resins, the bowling balls can have a tendency to dry through the evaporation of plasticizers, which can lead to degradation in performance of the bowling ball and may result in cracking.

Therefore, a need exists for a system that encapsulates a bowling ball to provide thermal insulation, thereby reducing temperature fluctuations and differentials and retaining desired softening agent levels, while extending the life of the bowling ball.

BRIEF SUMMARY OF THE INVENTION

The present disclosure provides a bowling ball enclosure that encases and reduces temperature fluctuations of, and within, a bowling ball. The bowling ball enclosure may include an inner layer and an outer layer that are made of a polymer material, the inner layer forming an interior region that receives the bowling ball, at least one of the inner layer and the outer layer being monolithic. The bowling ball enclosure may also include a bottom portion and a top portion, the top portion being reinforced with a stiffener to support the top portion, the stiffener being connected to at least one of the inner layer and the outer layer, the top portion being positionable from a first position to a second position to encapsulate the bowling ball; wherein in the first position, the top portion being in an open position to receive the bowling ball into the interior region, and in the second position, the top portion being in a closed position to encapsulate the bowling bowl, the top portion being folded towards the bottom portion to decrease an amount of empty space in the interior region. The bowling ball enclosure may further include an insulation layer intermediate the inner layer and the outer layer, the insulation layer having a top portion spaced from the stiffener by a sufficient distance such that a portion of the insulation layer is within the folded top portion in the second position. The bowling ball enclosure may include at least two bottom releasable fasteners being positioned on the outer layer in the bottom portion of the bowling ball enclosure. The bowling ball enclosure may also include at least two top releasable fasteners being positioned on the top portion of the bowling ball enclosure, the at least two top releasable fasteners being fastened to the at least two bottom releasable fasteners when the bowling ball enclosure is in the second position.

A further configuration is disclosed wherein the bowling ball enclosure may include at least two grips being positioned on opposing sides of the outer layer and below the stiffener of the top portion of the bowling ball enclosure, the at least two grips assisting a user to hold the bowling ball enclosure when the bowling ball enclosure is in the second position; at least one of the inner layer and the outer layer is sufficient to prevent tearing of the bowling ball enclosure due to a weight of the bowling ball; each of the at least two bottom releasable fasteners include an aperture to expel air from the interior region when bowling ball enclosure transitions from the first position to the second position; the aperture of the at least two bottom releasable fasteners is a grommet; the polymer material is polyester or polyethylene; the polymer material is biaxially-oriented polyethylene terephthalate; the bottom releasable fasteners and the top releasable fasteners are hook-and-loop fasteners; the insulation layer includes a rectangular sheet and a disk of insulation material, the rectangular sheet being rolled into a cylinder having a top portion and a bottom portion, the disk being positioned at the bottom position of the cylinder; the stiffener of the top portion of the bowling ball enclosure is plastic; the stiffener of the top portion of the bowling ball enclosure is made of high-density polyethylene (HDPE); the bowling ball enclosure includes a height and a width, the at least two bottom releasable fasteners being positioned below the midpoint of the height of the bowling ball enclosure; a bottom perforated air circulating ring support that is positioned at the bottom portion of the bowling ball enclosure;

the bottom perforated air circulating ring support is made of a perforated rigid and insulation material; the bottom perforated circulating ring support is positioned on the outer layer of the bowling ball enclosure; the at least two bottom releasable fasteners are on opposing sides of the bottom portion of the bowling ball enclosure; the at least two top releasable fasteners are on opposing sides of the top portion of the bowling ball enclosure.

A method is disclosed of utilizing a bowling ball enclosure to encase and reduce temperature fluctuations of a bowling ball. The method may include providing the bowling ball enclosure. The bowling ball enclosure may include an inner layer and an outer layer that are made of a polymer material, the inner layer forming an interior region that receives the bowling ball, at least one of the inner layer and the outer layer being monolithic. The bowling ball enclosure may also include a bottom portion and a top portion, the top portion being reinforced with a stiffener to support the top portion, the stiffener being connected to at least one of the inner layer and the outer layer, the top portion being positionable from a first position to a second position to encapsulate the bowling ball: in the first position, the top portion being in an open position to receive the bowling ball into the interior region, and in the second position, the top portion being in a closed position to encapsulate the bowling bowl, the top portion being folded towards the bottom portion to decrease the amount of empty space in the interior region. The bowling ball enclosure may further include an insulation layer intermediate the inner layer and the outer layer, the insulation layer having a top portion spaced from the stiffener by a sufficient distance such that a portion of the insulation layer is within the folded top portion in the second position. The bowling ball enclosure may include at least two bottom releasable fasteners being positioned on the outer layer in the bottom portion of the bowling ball enclosure. The bowling ball enclosure may also include at least two top releasable fasteners being positioned on the top portion of the bowling ball enclosure, the at least two top releasable fasteners being fastened to the at least two bottom releasable fasteners when the bowling ball enclosure is in the second position. The method may also include inserting the bowling ball into the interior region of the bowling ball enclosure. The method may further include closing the top portion of the bowling ball enclosure to encapsulate the bowling ball in the interior region of the bowling ball enclosure. The method may include folding the top portion of the bowling ball enclosure towards the bottom portion of the bowling ball enclosure, thereby expelling the air from the interior region of the bowling ball enclosure. The method may also include attaching each of the at least two top releasable fasteners to each of the at least two bottom releasable fasteners, respectively.

BRIEF DESCRIPTION OF THE SEVERAL VIEWS OF THE DRAWING(S)

The accompanying drawings, which are included to provide further understanding of the present disclosure and are incorporated in and constitute a part of this specification, illustrate aspects of the disclosure and together with the description serve to explain the principles of the disclosure. In the drawings.

DETAILED DESCRIPTION OF THE INVENTION

The detailed description set forth below is intended as a description of various configurations of the present disclosure and is not intended to represent the only configurations in which the present disclosure may be practiced. It will be apparent, however, to those of ordinary skill in the art that the present disclosure is not limited to the specific details set forth herein and may be practiced without these specific details.

Embodiments of the present disclosure provide an apparatus and a method of providing an insulating body for encompassing at least one bowling ball. The present disclosure addresses the problems associated with temperature variations on bowling balls, which can cause oils to seep out of the bowling ball material, and can cause material failures as well as inducing condensation when subsequently exposed to warmer temperatures. The present disclosure also provides for retaining a relatively high concentration of oil, plasticizer, and resin vapors in the environment of the retained bowling ball so as to reduce the evaporation rate of the oils, plastisizers, and resins from the bowling ball.

FIGS. 1-5 illustrate a representative bowling ball enclosure 100. The bowling ball enclosure 100 may include an inner layer 110 and an outer layer 120 that may be made of a polymer material. The polymer material may be selected to function as a vapor diffusion retarder, vapor barrier, solar barrier, as well as provide strength for retaining a bowling ball 140. In one configuration, the polymer material may be a polyester and in certain configurations a polyethylene terephthalate (PET) or a polyethylene, and in further configurations a polyester, biaxially-oriented polyethylene terephthalate, though it is recognized the material can be any other material suitable for the intended purpose and understood by one of ordinary skill in the art. In one configuration, the inner layer 110 and the outer layer 120 may be polyester films commercially available under the mark MYLAR® of Dupont Teijin Films U.S. Alternatively, it is contemplated at least one of the inner layer 110 and the outer layer 120 may be formed of a 4 to 6 mil (thousandths of an inch) thick polyethylene film.

The inner layer 110 of the bowling ball enclosure 100 may form an interior region 130 that receives the bowling ball 140. The inner layer 110 and the outer layer 120 may be monolithic that resists tearing and assists in retaining the bowling ball 140 in the bowling ball enclosure 100. That is, each the inner layer 110 and the outer layer 120 may be formed of a single integral piece, blank, of material. It is understood the blanks may include notches or cuts for forming into the desired shape. The inner layer 110 and the outer layer 120 of the bowling ball enclosure 100 may also be constructed to be sufficient to prevent tearing of the bowling ball enclosure 100 due to the weight of the bowling ball 140.

Figure 7A:
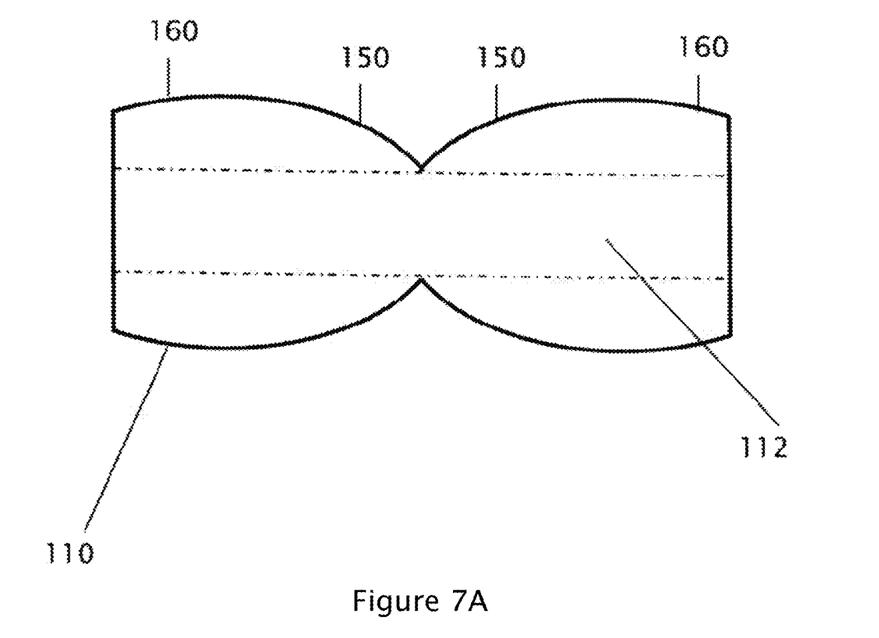
FIG. 7A is a plan view of a blank for forming a portion of the inner layer of the bowling ball enclosure.
Figure 7B:
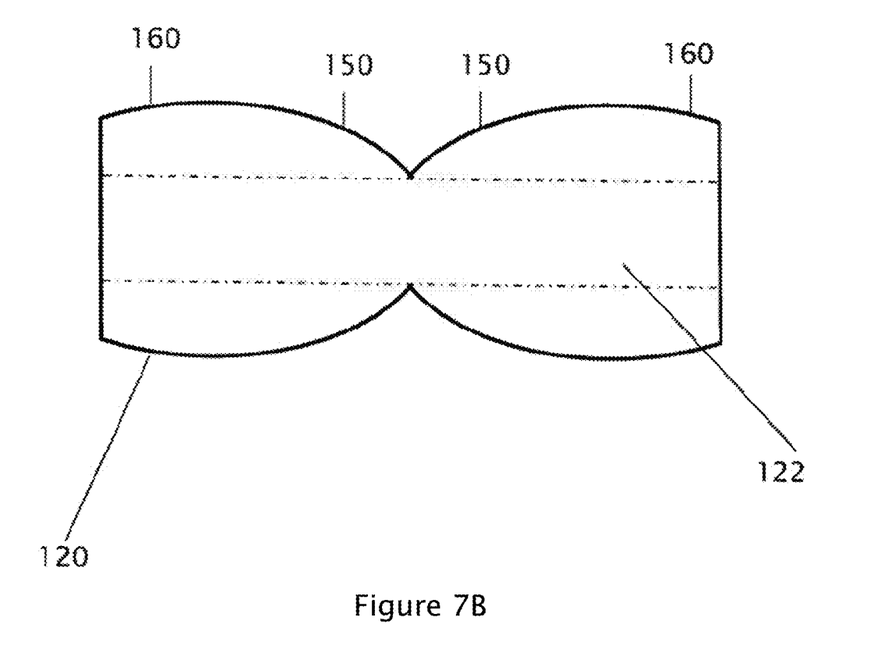
FIG. 7B is a plan view of a blank for forming a portion of the outer layer of the bowling ball enclosure.

Referring to FIGS. 7A and 7B, in one configuration, at least one of the inner layer 110 and the outer layer 120 may include a contiguous band of material 112, 122 respectively, extending from a top portion 160 of the bowling ball enclosure 100 through a bottom portion 150 of the bowling ball enclosure 100 to an opposing top portion 160 of the bowling ball enclosure 100. The contiguous band of material 112, 122 may be configured to be free of seams or joints, which could weaken the material of the bowling ball enclosure 100.

When the blank is formed up, the resulting bowling bowl enclosure 100 may include the bottom portion 150 and the top portion 160. The top portion 160 of the bowling ball enclosure 100 may be positionable from a first position to a second position to encapsulate the bowling ball 140 in the interior region 130 of the bowling ball enclosure 100.

Figure 1:
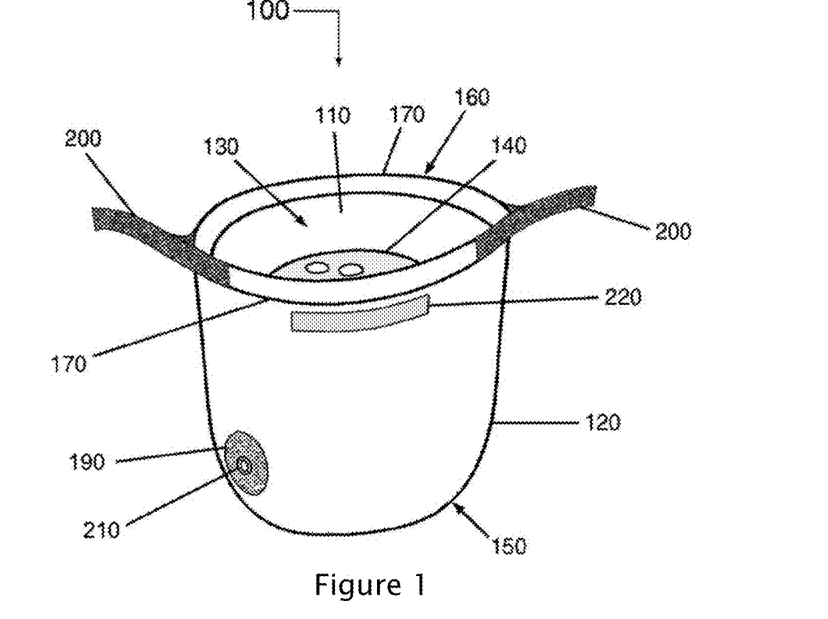
FIG. 1 is a perspective view of a bowling ball enclosure in a first position.
Figure 2:
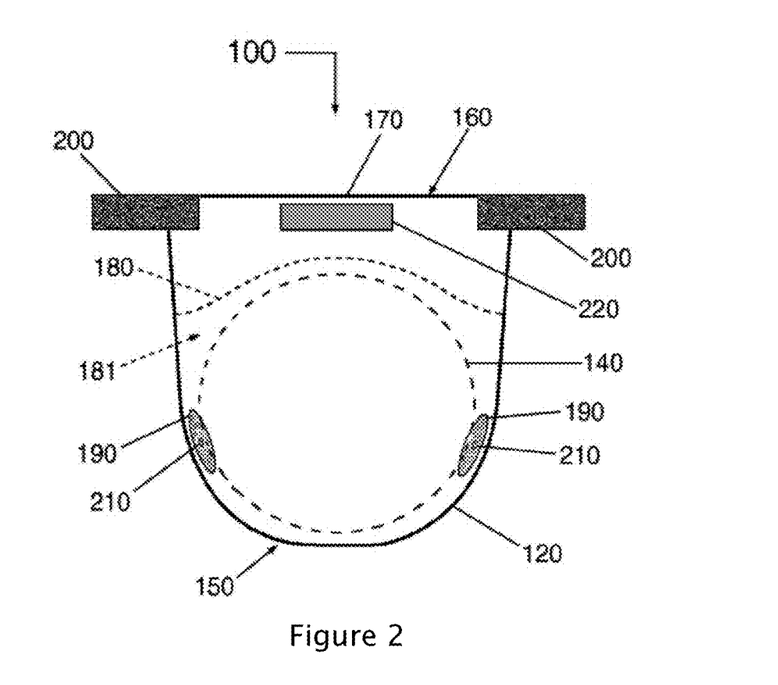
FIG. 2 is a side elevational view of the bowling ball enclosure in the first position.

In the first position, as shown in FIGS. 1 and 2, the top portion 160 of the bowling ball enclosure 100 may be in an open position to receive the bowling ball 140 into the interior region 130 of the bowling ball enclosure 100. The top portion 160 of the bowling ball enclosure 100 may have a circumference that is greater than the circumference of the bowling ball 140 to receive the bowling ball 140 into the interior region 130 of the bowling ball enclosure 100.

Figure 3:
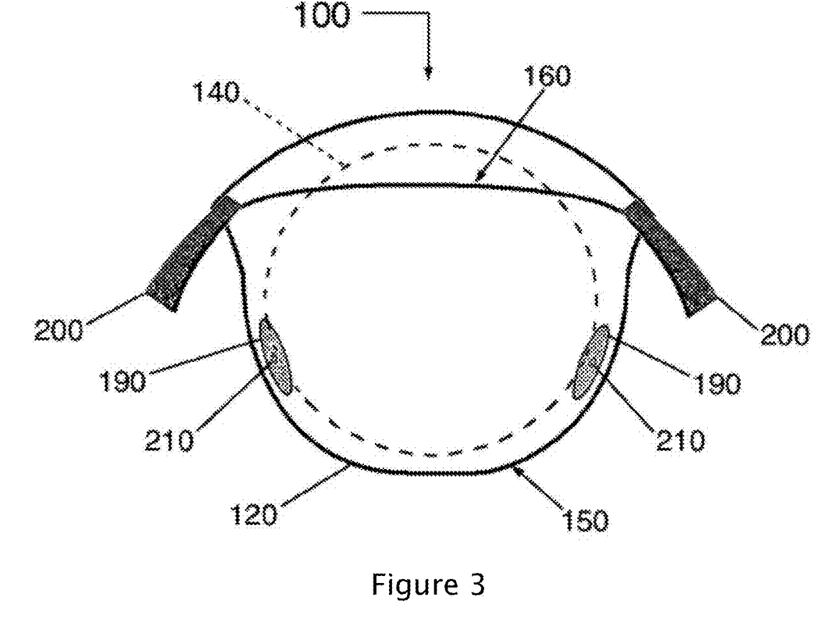
FIG. 3 is a top elevational view of the bowling ball enclosure in a second position.
Figure 4:
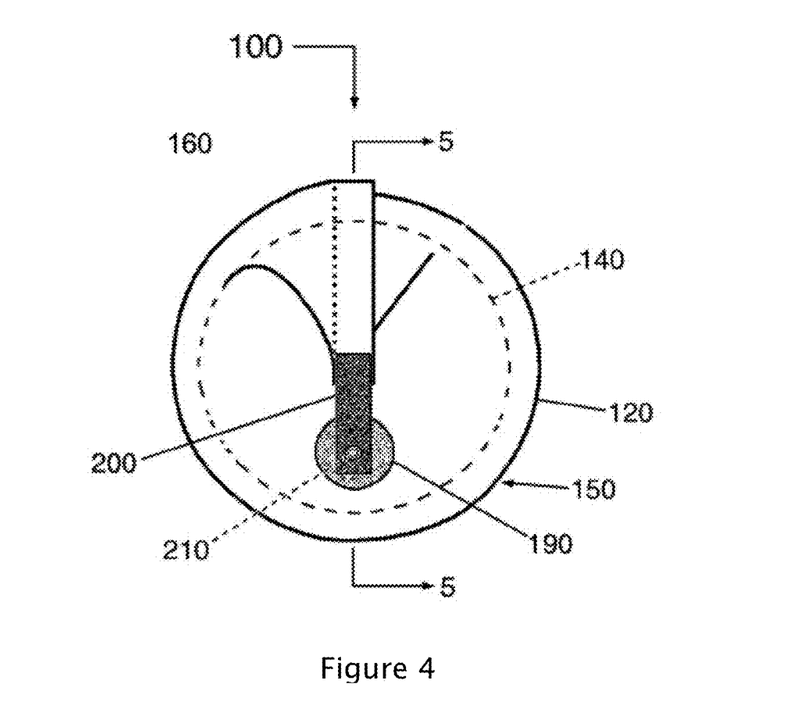
FIG. 4 is a side elevational view of the bowling ball enclosure in the second position.
Figure 5:
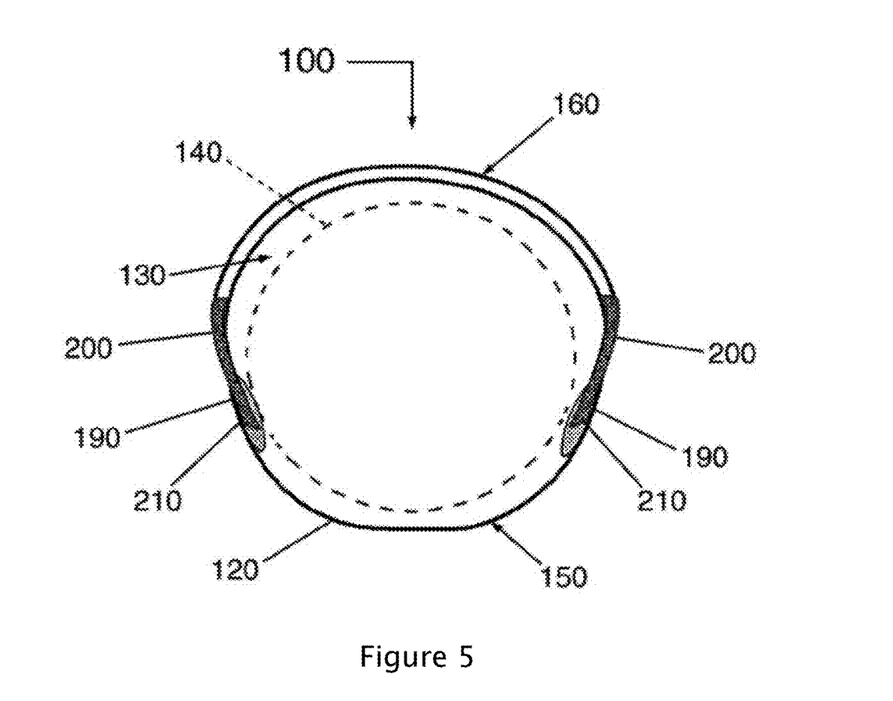
FIG. 5 is a cross-sectional view of the bowling ball enclosure as shown in FIG. 4.

In the second position, as shown in FIGS. 3-5, the top portion 160 of the bowling ball enclosure 100 may be in a closed position to encapsulate the bowling bowl 140 in the interior region 130 of the bowling ball enclosure 100. The top portion 160 of the bowling ball enclosure 100 may be folded towards the bottom portion 150 of the bowling ball enclosure 100 to decrease the amount of empty space in the interior region 130 of the bowling ball enclosure 100.

The top portion 160 of the bowling ball enclosure 100 may be reinforced with a stiffener 170 that may support the top portion 160 of the bowling ball enclosure 100. The stiffener 170 may also be connected to at least one of the inner layer 110 and the outer layer 120 of the bowling ball enclosure 100. In one configuration, the stiffener 170 is retained between the inner layer 110 and the outer layer 120 in the top portion 160 of the bowling ball enclosure 100. In one configuration, the stiffener 170 may have sufficient rigidity to retain the top portion 160 of the bowling ball enclosure 100 in an open arrangement when the bowling ball enclosure 100 is in the first position, yet as set forth below, the stiffener 170 may be sufficiently bendable to substantially follow the curve of the retained bowling ball 140. The stiffener 170 of the top portion 160 of the bowling ball enclosure 100 may be made of plastic, high-density polyethylene (HDPE), polyurethane, or any other material suitable for the intended purpose and understood by one or ordinary skill in the art.

The bowling ball enclosure 100 may also include an insulation layer 180 intermediate the inner layer 110 and the outer layer 120 of the bowling ball enclosure 100. The insulation layer 180 of the bowling ball enclosure 100 may have a top portion or edge 181 that may be spaced from the stiffener 170 by a sufficient distance such that a portion of the insulation layer 180 of the bowling ball enclosure 100 may be within the folded top portion 160 of the bowling ball enclosure 100 in the second position. That is, the thinner inner layer 110 and thinner outer layer 120 can be folded over or rolled at least once without disposing a portion of the insulation layer 180 therebetween then after the inner and outer layers 110, 120 have a fold over, the next fold causes a portion of the insulation layer 180 to be disposed within the subsequent fold, thereby ensuring the entire bowling ball is encapsulated by the insulation layer 180 as well as the inner and outer layers 110, 120.

In one configuration, the material of the insulation layer 180 may be at least slightly compressible so that a portion of the insulation layer can be captured within the folded portion of the bowling ball enclosure 100 in the second position. In addition, the material of the insulation layer 180 may have a sufficient R value to reduce the thermal stresses to the retained bowling ball 140 that would otherwise impart cracking during normal usage and storage of the bowling ball 140. A satisfactory material for the material of the insulation layer 180 may include recycled denim insulation, also known as natural cotton fiber insulation, made from scraps, chunks and clippings from the manufacture of denim clothing. In some configurations, the natural cotton fiber insulation includes a resin distributed throughout the insulation, wherein the resin provides a structure and resiliency to the resulting product. The uncompressed thickness of the insulation layer is between approximately ¼" and 1". Another flexible insulation can be fiberglass matt, closed or open cell foam, etc.

The insulation layer 180 can be formed by a rectangular sheet and a disk of insulation material. The rectangular sheet of insulation material may be rolled into a cylinder and joined along the longitudinal seam define an open top and an open bottom. The disk of insulation material may be joined to the cylinder of insulation material at the open bottom to form a closed end.

The bowling ball 100 may further include bottom releasable fasteners 190 that may be positioned on the outer layer 120 on the bottom portion 150 of the bowling ball enclosure 100. The bottom releasable fasteners 190 may be circular in shape, but may be any shape suitable for the intended purpose and understood by one of ordinary skill in the art. The bowling ball enclosure 100 may also include top releasable fasteners 200 that may be positioned on the top portion 160 of the bowling ball enclosure 100. The top releasable fasteners 200 may be in the shape of a strip with a width similar to the width of the stiffener 170, but may be any shape suitable for the intended purpose and understood by one of ordinary skill in the art.

The top releasable fasteners 200 may be fastened to the bottom releasable fasteners 190 when the bowling ball enclosure 100 is in the second position. The bottom releasable fasteners 190 and the top releasable fasteners 200 of the bowling ball enclosure 100 may be hook-and-loop fasteners or any other fastener suitable for the intended purpose and understood by one of ordinary skill in the art.

Each of the bottom releasable fasteners 190 of the bowling ball enclosure 100 may include an aperture 210 to expel air from the interior region 130 of the bowling ball enclosure 100 when bowling ball enclosure 100 transitions from the first position to the second position. The aperture 210 of the bottom releasable fasteners 190 of the bowling ball enclosure 100 may be a grommet.

The bottom releasable fasteners 190 may also be on opposing sides of the bottom portion 150 of the bowling ball enclosure 100 such that opposing sides of the bottom portion 150 of the bowling ball enclosure 100 are fully supported in the second position. The top releasable fasteners 200 may be on opposing sides of the top portion 160 of the bowling ball enclosure 100 such that opposing sides of the top portion 160 of the bowling ball enclosure 100 are fully supported in the second position.

The bowling ball enclosure 100 may also include grips 220 that may be positioned on opposing sides of the outer layer 120 and below the stiffener 170 of the top portion 160 of the bowling ball enclosure 100. The grips 220 of the bowling ball enclosure 100 may assist a user in holding the bowling ball enclosure 100 with one hand when the bowling ball enclosure 100 is in the second position. The grips 220 can be formed of patches of material bonded to the outer layer 120, wherein the material of the grips 220 may have a higher coefficient of friction than the material of the outer layer 120. In one configuration, the grips 220 may be a thermoplastic elastomer. The bowling bowl enclosure 100 may also utilize one of the grips 220 to assist the user in positioning the top portion 160 of the bowling ball enclosure 100 from the first position to the second position. In one configuration, the bowling ball enclosure 100 includes at least two grips 220 being positioned on opposing sides of the outer layer 120 and below the stiffener 170 of the top portion of the bowling ball enclosure, wherein the grips assist a user in holding the bowling ball enclosure when the bowling ball enclosure is closed about the bowling ball to encapsulate the bowling ball.

The bowling ball enclosure 100 defines a height and a width. A center/midpoint of the bottom releasable fasteners 190 of the bowling ball enclosure 100 may be positioned at or below the midpoint of the height of the bowling ball enclosure 100. In this configuration, the bottom releasable fasteners 190 support the bowling ball enclosure 100 when held by the user in the second position. That is, by the bottom releasable fasteners 190 being engaged below the midpoint of the bowling ball 140 retained within the bowling ball enclosure 100, a portion of the weight of the bowling ball 140 may be carried by the folded material of the inner layer 110 and outer layer 120, rather than by the layers alone. For example, in the second position, if the bottom releasable fasteners 190 of the bowling ball enclosure 100 are above the midpoint of the height of the bowling ball enclosure 100, the bowling ball enclosure 100 may have an increased tendency to tear due to the tension caused by the weight of the bowling ball 140.

Figure 6:
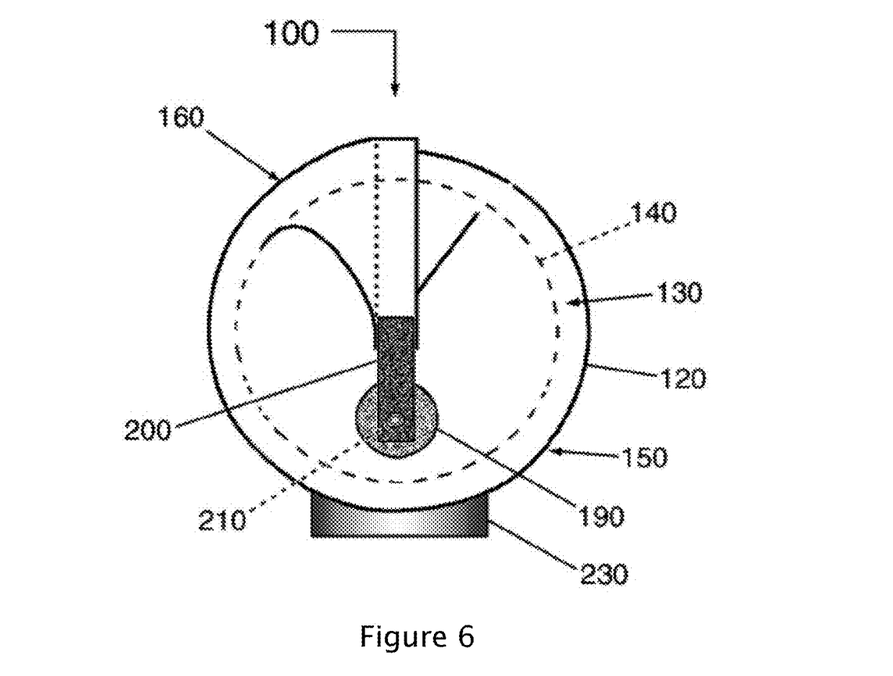
FIG. 6 is a side elevational view of the bowling ball enclosure including a bottom perforated circulating ring support that is positioned on and under an outer layer of the bowling ball enclosure.

As shown in FIG. 6, the bowling ball enclosure 100 may further include a bottom perforated circulating ring support 230 that may be positioned at the bottom portion 150 of the bowling ball enclosure 100. The bottom perforated circulating ring support 230 of the bowling ball enclosure 100 may be configured to position the bowling ball 140 in a particular portion of the interior region 130 of the bowling ball enclosure 100. The bottom perforated circulating ring support 230 also allows the bowling ball 140 to be further separated from the ground or support surface so as to decrease the temperature difference between the top and bottom regions of the bowling ball 140. The bottom perforated circulating ring support 230 may be positioned on the outer layer 120 of the bowling ball enclosure 100. The bottom perforated circulating ring support 230 of the bowling ball enclosure 100 may also be positioned in combination with the outer layer 120 of the bowling ball enclosure.

The bottom perforated circulating ring support 230 of the bowling ball enclosure 100 may be made of a rigid and insulation material or any other material suitable for the intended purpose and understood by one of ordinary skill in the art. In select configurations, the bottom perforated circulating ring support 230 is polymeric including plastic, or rubber or thermoset. The bottom perforated circulating ring support 230 may be permanently attached to the bowling ball enclosure 100 by an adhesive, stitching, sewing, stamping, or any other method suitable for the intended purpose and understood by one of ordinary skill in the art. It is further contemplated the bottom perforated circulating ring support 230 can be releasably connected to the bowling ball enclosure 100 such as by hook and loop fasteners, engaging loops or strings. It is also understood, the bottom perforated circulating ring support 230 can be entirely separate from the bowling ball enclosure 100, wherein the user can locate the bottom perforated circulating ring support 230 within the bowling ball enclosure 100 when not is use and locate the bottom perforated circulating ring support 230 between the bowling ball enclosure 100 and the floor when in use.

It is further contemplated the bottom perforated circulating ring support 230 can be coupled to the bowling ball enclosure 100 by a tether 280, such as a cord, a strap or a binding to preclude unintended separation of the bottom perforated circulating ring support from the bowling ball enclosure 100. The tether 280 can have a sufficient length to permit operable location of the bottom perforated circulating ring support 230 outside the bottom surface of the bowling ball enclosure 100 and storage location within the bowling ball enclosure 100.

Figure 8:
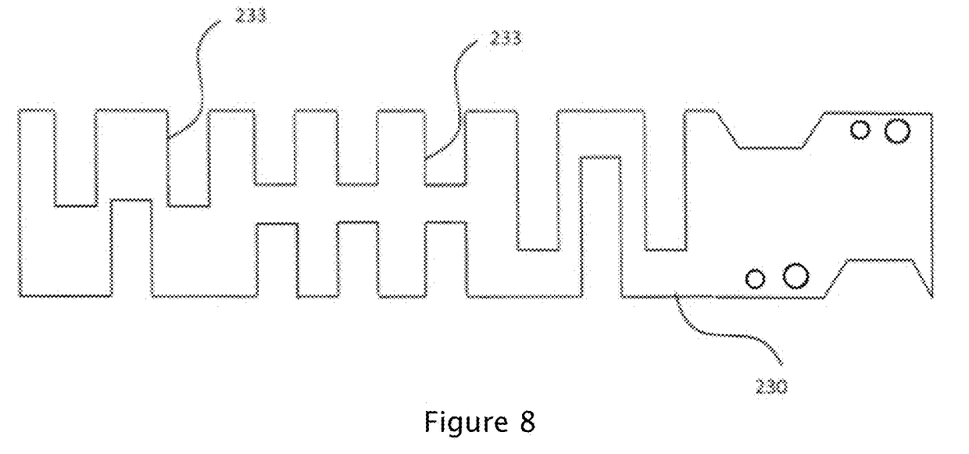
FIG. 8 is a side elevational schematic of various configurations of the bottom perforated circulating ring support.

As seen in FIG. 8, the bottom perforated circulating ring support 230 includes a plurality of apertures or passages 233 to permit an air flow between an interior of the bottom perforated circulating ring support and an exterior of the bottom perforated circulating ring support. The passages 233 can have a closed periphery or be formed by recesses, slots, openings, or holes extending from a top and/or bottom edge of the bottom perforated circulating ring support. The slots can have a height so that the slots extend more than half a height of the bottom perforated circulating ring support and thus the slots are offset. Alternatively, the slots can be vertically aligned and extend less than half a height of the bottom perforated circulating ring support 230. In one configuration, the passages 233 are sufficient to allow a temperature differential to form within a volume defined by the support surface, the bottom perforated circulating ring support 230 and the bottom of the bowling ball enclosure 100 that is positioned over and on the bottom perforated circulating ring support. Without such perforations or slots 233, the ring support would create a column of air that is retained within the support, wherein the column of air directly transfers the temperature of the ground or support surface to the outer layer 120 of the bowling ball enclosure 100, which may impart a cracking of a bowling ball 140 retained within the bowling ball enclosure. However, the slots 233 are sufficient to create a convention through the bottom perforated circulating ring support 230 to preclude the creation of a stagnant column of air.

It is believed that in an equilibrium state, a temperature differential between the two polar regions (250 and 260) of the bowling ball 140 can be limited to approximately 2-3° F. by means of the bottom perforated circulating ring support vs. an approximately 5-7° temperature differential using a solid non-perforated ring support. That is, it is believed that in one configuration in an equilibrium state, the temperature differential between the two polar regions (250 and 260) can be reduced by approximately 50% by means of the bottom perforated circulating ring support vs. the temperature differential with a solid non-perforated ring support.

The bottom perforated circulating ring support 230 can have a height from approximately 0.5 inches to approximately 5 inches, wherein in one configuration the height is between approximately 0.75 inches and 1.5 inches. The diameter of the bottom perforated circulating ring support 230 can be between approximately 2 inches to 6 inches, wherein the height and diameter of the bottom perforated circulating ring support 230 are selected to provide for spacing of the bowling ball 140 or bowling ball enclosure 100 from any support surface by at least 0.2 inches. It is noted that as the diameter of the bottom perforated circulating ring support 230 increases, the height of the bottom perforated circulating ring support must increase to maintain the desired spacing from the support surface. The diameter and height of the bottom perforated circulating ring support 230 are selected for retaining the bowling ball enclosure and maintaining the necessary stability for the intended location of the bowling ball enclosure. In one configuration, in order for the poles of the bowling ball 140 to remain within 2-3° F. of each other when placed on a surface that is 10° F. below the ambient air temperature, the bowling ball must be placed on a ½" high and 2.5" diameter bottom perforated circulating ring support 230 to interrupt the temperature conductivity from the support surface as well as compensate for the local compression of the insulation layer 180.

The method of utilizing the bowling ball enclosure 100 to encase and reduce temperature fluctuations of the bowling ball 140 may include providing the bowling ball enclosure 100, inserting the bowling ball 140 into the interior region 130 of the bowling ball enclosure 100, closing the top portion 160 of the bowling ball enclosure 100 to encapsulate the bowling ball 140 in the interior region 130 of the bowling ball enclosure 100, folding the top portion 160 of the bowling ball enclosure 100 towards the bottom portion 150 of the bowling ball enclosure 100, thereby expelling the air from the interior region 130 of the bowling ball enclosure 100, and attaching the top releasable fasteners 200 to each of the respective bottom releasable fasteners 190 of the bowling ball enclosure 100. As the bowling ball enclosure 100 is transitioned to the second position, the absence of the insulation layer 180 adjacent the stiffener, allows the folding of the inner and outer layers with the stiffener of at least 180 degrees and in select configurations to approximately 270 degrees. From 270 degrees to 360 to 405 degrees, the upper portion of the insulation layer is then caught in the formed folds and thus encases the retained bowling ball. That is, there are no gaps in the insulation layer extending about the bowling ball.

Thus, the present disclosure addresses current bowling balls formed of reactive urethane resins which can render the balls prone to cracking due to (i) rapid or uneven changes in the temperature of the ball as a whole and (ii) rapid or uneven changes in the temperatures between the multiple layers whereas the reactive urethane cover stock encases the core and filler materials which is are made from different density materials. In addition, the present disclosure assists in reducing the propensity of reactive urethane resin balling balls to crack as the ball ages and dries out.

The present design provides a number of advantages including (i) a configuration which provides for a compact encasing of the bowling ball 140 so as to fit into most commercially available bowling ball bags as well as providing efficient use of materials and manufacturing steps for cost efficiency; (ii) use of the vapor barrier material, such as Mylar® polyester film, for the inner and outer layer seals the bowling ball against resin evaporation thereby minimizing aging which can eventually lead to cracking; (iii) the Mylar® film increasing resistance to solar radiation and heating; (iv) effective encapsulation of the retained bowling ball with the insulation layer 180 sandwiched between in the inner and the outer layer 110, 120 such that as the bowling ball enclosure is moved to the second position, there are no gaps in the insulation surrounding the bowling ball, in addition the flexible insulation layer insures conformity to the spherical bowling ball as well as conformity of the temperature of the bowling ball around the entire spherical surface. The present structure reduces relative cold or hot spots that can lead to cracking if the temperature differential exceeds approximately 7° F.

The present design and rigidity of the inner and outer layers 110, 120 along with the insulation layer 180 offers easy insertion and removal of the bowling ball 140 which is crucial for the convenience of the user.

The semi-rigid plastic stiffener 170 which can be used to connect or bond both inner and outer layers 110, 120 along the top of the upper portion facilitates a mechanism for a quick and easy sealing of the bowling ball enclosure 100 about the bowling ball 140.

The hook and look fasteners located at the end regions of the sealing strip attach to mating hook and look fasteners located below the center region of the bowling ball enclosure and are positioned below an equator of the retained bowling ball to bear the weight of the balling ball.

In the present disclosure, the holes in the releasable fasteners allow for venting of trapped air while allow for subsequently sealing upon being covered over by the mating releasable fasteners.

Further, the construction of the monolithic inner and outer layers 110, 120 of the laminated film as set forth above allows for a vertically positioned non-sealed strap or band of unbroken or seam free material within each of the inner and outer layers to maximize the weight bearing ability of the bowling ball enclosure.

The present disclosure also provides a useful handle after transitioning from the first position to the second position, wherein the folded sections of the inner and outer layer in conjunction with the stiffener for the handle for ease of carrying. The inclusion of the rubber strip grip reduces slipping during transport.

The invention has been described in detail with particular reference to a present preferred embodiment, but it will be understood that variations and modifications can be effected within the spirit and scope of the disclosure. The presently disclosed embodiments are therefore considered in all respects to the illustrative and not restrictive. The scope of the disclosure is indicated by the appended claims, and all changes that come within the meaning and range of equivalents thereof are intended to be embraced therein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination.

What is claimed is:

1. A bowling ball assembly for retaining a bowling ball relative to a support surface, the bowling ball assembly comprising:
   (a) a bowling ball; and
   (b) a circulating ring support sized to engage and support the bowling ball to locate the bowling ball a spaced distance from the support surface, the circulating ring support having a circumferential wall with at least one passage in the circumferential wall between an inside of the circulating ring support and an outside of the circulating ring support, the at least one passage configured such that upon operable engagement of the circulating ring support and the bowling ball air can pass through the at least one passage between the inside of the circulating ring support and the outside of the circulating ring support.

2. The bowling ball assembly of claim 1, wherein the at least one passage is a slot.

3. The bowling ball assembly of claim 1, wherein the at least one passage is a hole.

4. The bowling ball assembly of claim 1, wherein the at least one passage is a recess from one of an upper edge of the circulating ring support and a lower edge of the circulating ring support.

5. The bowling ball assembly of claim 1, wherein the at least one passage is configured to induce air circulation between inside the circulating ring support and outside the circulating ring support.

6. The bowling ball assembly of claim 1, wherein the at least one passage is configured to preclude creation of a stagnate column of air within the circulating ring support between the support surface and the bowling ball.

7. The bowling ball assembly of claim 1, further comprising a flexible enclosure encasing the bowling ball.

8. The bowling ball assembly of claim 7, wherein the flexible enclosure includes a vapor barrier.

9. The bowling ball assembly of claim 1, wherein the circulating ring support is cylindrical.

10. A bowling ball assembly for retaining a bowling ball relative to a support surface, the bowling ball assembly comprising:
   (a) an enclosure sized to receive the bowling ball, the enclosure having a vapor barrier; and
   (b) a circulating ring support sized to engage and support the bowling ball to locate the bowling ball a spaced distance from the support surface, the circulating ring support having at least one passage between an inside of the circulating ring support and an outside of the circulating ring support.

11. The bowling ball assembly of claim 10, wherein the at least one passage is configured such that upon operable engagement of the circulating ring support and the bowling ball air can circulate through the at least one passage between the inside of the circulating ring support and the outside of the circulating ring support.

12. The bowling ball assembly of claim 10, wherein the at least one passage is configured to preclude creation of a stagnate column of air within the circulating ring support between the support surface and the enclosure.

13. The bowling ball assembly of claim 10, wherein the circulating ring support is cylindrical.

14. An assembly for retaining a bowling ball relative to a support surface, the assembly comprising:
   (a) a circulating ring support configured to engage and support a bowling ball to locate the bowling ball a spaced distance from the support surface, the circulating ring support having a circumferential wall defining an open top, the circumferential wall having at least one passage in between an inside of the circulating ring and an outside of the circulating ring, the at least one passage configured such that upon operable engagement of the circulating ring and the bowling ball air can circulate through the at least one passage between the inside of the circulating ring and the outside of the circulating ring.

15. The assembly of claim 14, wherein the circulating ring has a height between 0.5 inches and 5 inches.

16. The assembly of claim 14, wherein the circulating ring has a diameter between 2 inches and 6 inches.

17. The assembly of claim 14, wherein the circumferential wall is cylindrical.

\* \* \* \* \*